United States Patent
Someya et al.

(10) Patent No.: US 7,893,640 B2
(45) Date of Patent: Feb. 22, 2011

(54) BRUSHLESS MOTOR CONTROL APPARATUS AND CONTROL METHOD AND MOTOR SYSTEM

(75) Inventors: Toru Someya, Kiryu (JP); Shinji Shibuya, Kiryu (JP); Toshiaki Isomura, Kiryu (JP)

(73) Assignee: Mitsuba Corporation, Kiryu-Shi (JP)

( * ) Notice: Subject to any disclaimer, the term of this patent is extended or adjusted under 35 U.S.C. 154(b) by 578 days.

(21) Appl. No.: 11/887,789

(22) PCT Filed: Apr. 4, 2006

(86) PCT No.: PCT/JP2006/307113
§ 371 (c)(1),
(2), (4) Date: Oct. 2, 2007

(87) PCT Pub. No.: WO2006/107040
PCT Pub. Date: Oct. 12, 2006

(65) Prior Publication Data
US 2009/0009117 A1    Jan. 8, 2009

(30) Foreign Application Priority Data
Apr. 4, 2005    (JP) .............................. 2005-107501
Apr. 4, 2005    (JP) .............................. 2005-107502

(51) Int. Cl.
H02P 6/00    (2006.01)
H02P 6/16    (2006.01)

(52) U.S. Cl. ............................ 318/400.35; 318/400.06; 318/400.32

(58) Field of Classification Search ............ 318/400.35, 318/400.06, 400.32
See application file for complete search history.

(56) References Cited

U.S. PATENT DOCUMENTS

| 6,034,493 | A  | * | 3/2000  | Boyd et al.     | 318/400.31 |
| 6,362,583 | B1 | * | 3/2002  | Bahlmann et al. | 318/400.32 |
| 2004/0263104 | A1 |  | 12/2004 | Iwanaga et al.  |            |

FOREIGN PATENT DOCUMENTS

| JP | 64-008890 | 1/1989 |
| JP | 08-182379 | 7/1996 |
| JP | 10-028395 | 1/1998 |
| JP | 2002-95280 | 3/2002 |
| JP | 2004-166417 | 6/2004 |
| JP | 2005-39991 | 2/2005 |

OTHER PUBLICATIONS

International Search Report of PCT/JP2006/307113 dated Jul. 11, 2006 (w/English language translation).

* cited by examiner

*Primary Examiner*—Bentsu Ro
*Assistant Examiner*—Erick Glass
(74) *Attorney, Agent, or Firm*—Kenyon & Kenyon, LLP

(57) ABSTRACT

A brushless motor control apparatus includes a mask processing unit to which digital induced voltage signal is input, a energizing current timing generation processing unit, a pulse width detection unit, and an advance angle correction unit for performing advance angle correction. The pulse width detection unit measures pulse width of spike voltage, and the advance angle correction unit calculates the correction to the advance angle according to the length of this pulse width. The energizing current timing generation processing unit takes half the value obtained after subtracting the correction value from the edge interval of the position detection signal generated in the mask processing unit as the advance angle.

11 Claims, 13 Drawing Sheets

BRUSHLESS MOTOR CONTROL APPARATUS AND CONTROL METHOD AND MOTOR SYSTEM

TECHNICAL FIELD

The present invention relates to a brushless motor control apparatus, control method and motor system.

Priority is claimed on Japanese Patent Application No. 2005-107501 and the Japanese Patent Application No. 2005-107502, both filed Apr. 4, 2005, the contents of which are incorporated herein by reference.

BACKGROUND ART

Control apparatus of brushless motor controls the rotation of motor while switching the current energizing the stator coil wound in coil shape. The timing for switching the energizing current is determined by detecting the magnetic pole position of the stator. In the conventional control apparatus of brushless motor, the position of rotation of rotor was detected by obtaining the induced voltage generated in the stator coil by the rotation of the rotor and no sensor for position detection is installed separately from considerations of miniaturization of the entire system and so on. More specifically, the voltage at the neutral point of the stator coil and the induced voltage of the stator coil are compared using the comparator, the variation time of output signal of comparator is measured, and the timing for switching the energizing current to the stator coil is determined based on this variation time (for example, refer to Patent Document 1 below).

When the energizing current is switched and current becomes off, the flywheel current flows until the energy accumulated in the coil becomes zero, and the spike induced voltage (spike voltage) that occurs consequently is generated in the stator coil. For this reason, the control apparatus must generate a mask signal, remove such spike voltage as noise, and judge the switching timing. The conventional method to remove spike voltage includes the method of detecting separately the voltage drop between the control apparatus and the stator coil of the brushless motor, generating a reset signal when this voltage drop reaches the same level as the standard voltage, and ignoring the position detection only in the spike voltage space (for example, refer to Patent Document 2 below). To generate a mask signal to mask the spike voltage, means is available to switch on the mask signal when the generation of spike voltage is detected, and when a preset time set beforehand has elapsed the mask signal is switched off (for example, refer to Patent Document 3 below).

[Patent Document 1] Japanese Unexamined Patent Application, First Publication No. S64-8890
[Patent Document 2] Japanese Unexamined Patent Application, First Publication No. H08-182379
[Patent Document 3] Japanese Unexamined Patent Application, First Publication No. H10-28395

The pulse width of the spike voltage in the control method described in Patent Document 1 increases with the increase in the current energizing the stator coil; thus, the point of intersection of the induced voltage and the voltage at the neutral point was sometimes hidden by the spike voltage, depending on the loading condition. In such cases, the position could not be detected, and the brushless motor suffered loss of synchronism.

Moreover, as described in Patent Document 2, to separately detect the voltage drop, a bidirectional diode and bidirectional photocoupler, flip-flop circuit and so on are necessary, so that the problem becomes one of complicated configuration of the apparatus. Furthermore, as described in Patent Document 3, when a mask signal is generated from the pulse of spike voltage, the problem becomes one in which the mask signal is not generated when spike voltage is not generated. In such cases, when spike voltage is generated when the energizing current is switched subsequently, this spike voltage cannot be eliminated, and it becomes difficult to differentiate spike voltage and induced voltage waveforms. Consequently, the problem that occurred was that the position of the rotor cannot be detected, and the timing for switching the current energizing the stator coil cannot be controlled.

DISCLOSURE OF INVENTION

This invention is made based on the considerations mentioned above. The object of the invention is to perform stable rotational control without installing a separate sensor in a brushless motor.

To resolve the problems mentioned above, a brushless motor control apparatus according to a first aspect of the present invention is provided with a drive circuit for obtaining a rotating magnetic field by energizing a plurality of stator coils disposed so as to apply a rotating magnetic field to the rotor having permanent magnet, and for sequentially switching the current energizing the stator coil based on a position detection signal obtained by comparing the change in induced voltage generated in the stator coil not energized by rotation of the rotor and the standard voltage, and a timing varying circuit for changing the timing to switch the current energizing the stator coil according to the pulse width of induced voltage generated in the stator coil immediately after switching the current energizing the stator coil.

This brushless motor control apparatus performs advance angle correction of the position detection signal according to the pulse width of induced voltage occurring immediately after switching the energizing current. When the pulse width of induced voltage generated immediately after switching the energizing current becomes large, the current timing is speeded up according to the pulse width, and the non-detection of voltage that becomes the standard because of being hidden in the pulses of induced voltage generated immediately after switching the energizing current is prevented.

In the brushless motor control apparatus of this first aspect, the timing for switching the current energizing the stator coil may be advanced only by half the pulse width of spike voltage generated due to flywheel current.

The brushless motor control apparatus performs advance angle correction according to the pulse width of spike voltage as the induced voltage occurring immediately after switching the energizing current. More specifically, by advancing only half the pulse width of the spike voltage, if the pulse width of the spike voltage becomes large, the energizing current timing is speeded up, and the non-detection of voltage that becomes the standard because of being hidden by the spike voltage is prevented.

A motor system according to a first aspect of the present invention is provided with the brushless motor control apparatus according to the first aspect mentioned above, and a brushless motor.

Based on the position detection signal generated by the control apparatus, the current energizing each stator coil of the brushless motor is switched, and rotational control of the rotor is performed in this motor system.

A brushless motor control method according to a first aspect of the present invention includes a process to obtain a rotating magnetic field by energizing a plurality of stator coils disposed so as to apply a rotating magnetic field to a rotor having permanent magnet, a process for sequentially switching the current energizing the stator coil based on a position detection signal obtained by comparing the change in induced voltage generated in the stator coil not energized by the rotation of the rotor and the standard voltage, and a timing varying process for changing the timing to switch the current energizing the stator coil according to the difference in the energizing current switching interval for the stator coil and the pulse width of the induced voltage generated in the stator coil immediately after switching the current energizing the stator coil.

In the brushless motor control method, the difference between the interval for switching the energizing current and the pulse width of induced voltage generated immediately after switching the energizing current is obtained, and the timing for switching the energizing current is advanced according to the magnitude of this difference.

The brushless motor control method according to the first aspect mentioned above, may include a process to stop measurement for only a period equivalent to the pulse width of the induced voltage generated in the stator coil immediately after switching the current energizing the stator coil when the energizing current switching interval of the stator coil is measured.

When obtaining the difference in the control method of this brushless motor, the timer and the like is stopped only for a period equivalent to that of the pulse width of the induced voltage immediately after switching the energizing current so that the difference is obtained without performing a subtraction. The timing for switching the energizing current is advanced according to the magnitude of the difference obtained in this way.

To resolve the problems mentioned above, the brushless motor control apparatus according to a second aspect of the present invention is provided with a drive circuit for obtaining a rotating magnetic field by energizing a plurality of stator coils disposed so as to apply a rotating magnetic field to a rotor having permanent magnet, and for sequentially switching the current energizing the stator coil based on the position detection signal obtained by comparing the change in the induced voltage generated in the stator coil not energized by the rotation of the rotor and the standard voltage; and a mask signal generation unit for generating mask signal based on the position detection signal to mask the change in voltage generated in the stator coil immediately after switching the current energizing the stator coil.

The brushless motor control apparatus generates the position detection signal indicated at the rotor position from the change in voltage of the stator coil, and generates a mask signal using this position detection signal. For this reason, mask signal is always generated regardless of whether spike voltage due to flywheel current is generated or not. Thus, the induced voltage signal required for position detection can be accurately and stably extracted.

The mask signal in the brushless motor control apparatus according to the second aspect mentioned above, may be generated before switching the current energizing the stator coil.

Since the mask signal is already generated when the energizing current is actually switched in the brushless motor control apparatus, spike voltage due to the flywheel current can be correctly removed. As a specific example, the timing for changing the energizing current is determined from the position detection signal, and the mask signal is generated before output of the command signal to switch the energizing current.

The pulse width of the mask signal in the brushless motor control apparatus of the second aspect mentioned above may be a fixed electrical angle.

The mask signal is generated beforehand for a fixed period only in the brushless motor control apparatus. Therefore, comparison of the induced voltage signal required for position detection and the voltage that becomes a standard can be accurately made, and the position of the rotor can be correctly detected.

The motor system according to a second aspect of the present invention is provided with the brushless motor control apparatus according to the second aspect mentioned above, and a brushless motor.

Based on the position detection signal generated by the control apparatus, the current energizing each stator coil of the brushless motor is switched, and rotational control of the rotor is performed in this motor system. At this stage, the mask signal is generated based on the position detection signal, and the spike voltage generated when switching the energizing current is eliminated.

The brushless motor control method according to a second aspect of the present invention includes a process for obtaining a rotating magnetic field by energizing a plurality of stator coils disposed so as to apply a rotating magnetic field to a rotor having permanent magnet, and for sequentially switching the current energizing the stator coil based on the position detection signal obtained by comparing the change in the induced voltage generated in the stator coil not energized by the rotation of the rotor and the standard voltage; and a process for generating a mask signal based on the position detection signal and for masking the change in the voltage generated in the stator coil immediately after switching the current energizing the stator coil.

This brushless motor control method generates the position detection signal indicating the rotor position, controls the brushless motor based on this position detection signal, and feeds back this position detection signal for generating the mask signal. For this reason, mask signal is always generated regardless of whether spike voltage due to flywheel current is generated or not; thus, the induced voltage signal required for position detection can be accurately and stably acquired.

According to the first aspect of the present invention, advance angle correction can be performed according to the pulse width of the induced voltage generated immediately after switching the energizing current. Therefore, when the pulse width of the induced voltage immediately after switching the energizing current increases due to the increase in load in the brushless motor, the timing for switching the energizing current will be corrected for advance angle accordingly, and comparison between the voltage that becomes the standard and the induced voltage can be made. Consequently, signal for detection the position of the rotor can be accurately obtained even if load variation occurs, and as a result, loss of synchronism of the brushless motor can be prevented.

Also, according to the second aspect of the present invention, the mask signal is generated using the position detection signal used in switching the current energizing the stator coil; so that the mask signal can be generated regardless of whether the spike voltage due to the flywheel current is generated or not generated. Consequently, the induced voltage signal required for position detection, and the signal of spike voltage to be eliminated can be correctly differentiated, the position of the rotor can be accurately detected, and loss of synchronism of the brushless motor can be prevented.

BEST MODE FOR CARRYING OUT THE INVENTION

Figure 1:
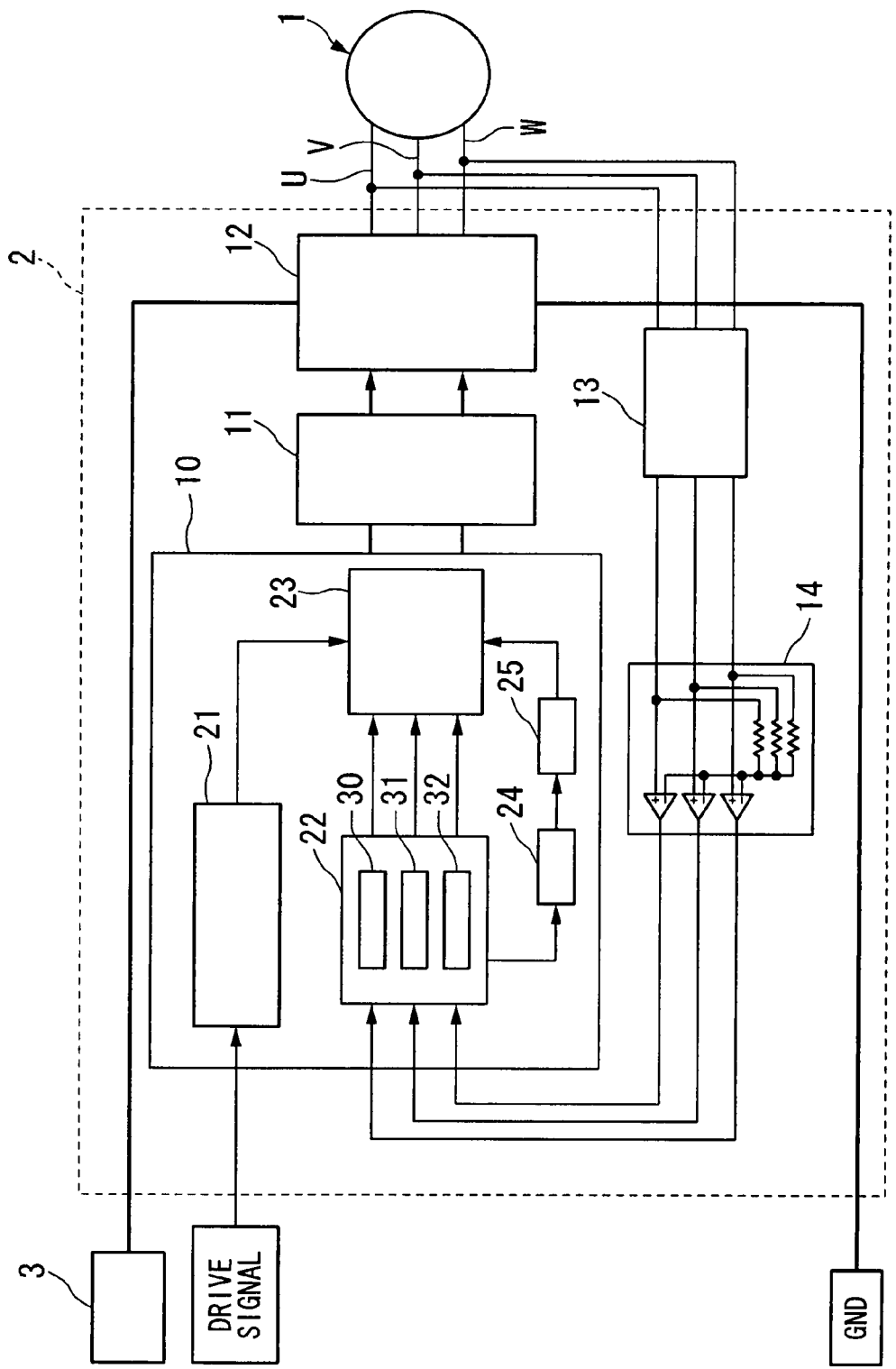
FIG. 1 is a block diagram that shows the motor system including the brushless motor control apparatus according to a first embodiment of the present invention.

The best mode for carrying out the invention will be described hereinafter in detail referring to the drawings.

FIG. 1 shows the schematic configuration of motor system including brushless motor. This motor system is provided with brushless motor 1, and drive device 2 of the brushless motor 1, such that energizing current control is performed from power source 3 through the drive device 2.

Figure 2:
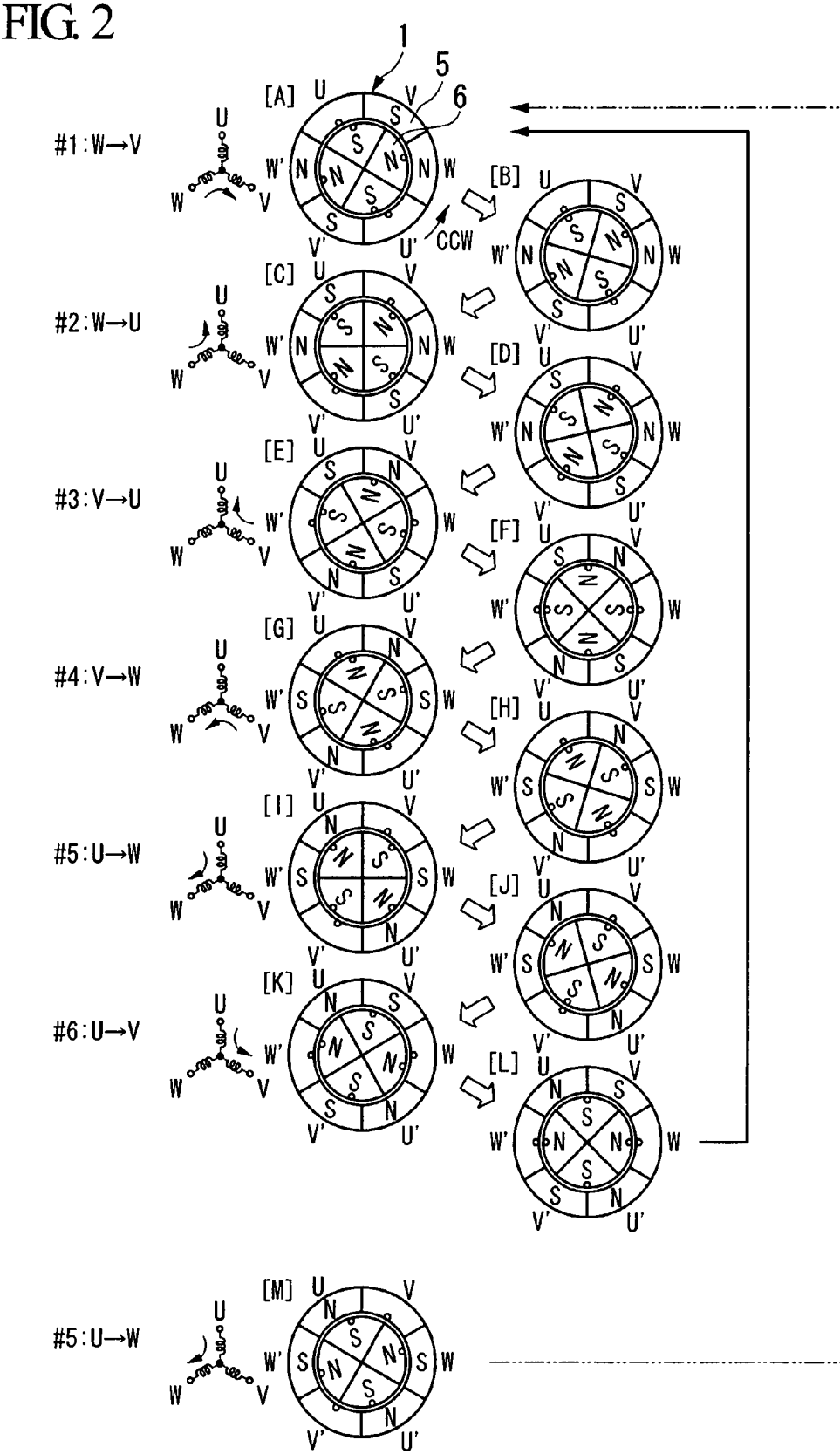
FIG. 2 shows the induced state of the stator and the rotor, and the energizing current pattern of the brushless motor used in the present invention.

As shown in FIG. 2, the main components of the brushless motor 1 are a stator 5 and a rotor 6. The stator is wound with three stator coils U, V and W which are so called star-connected. The rotor 6 includes a rotating shaft and permanent magnets wherein a plurality of magnetic poles (north pole and south pole) are disposed in the circumferential direction of the rotating shaft. The brushless motor 1 may be an inner-rotor type or outer-rotor type brushless motor.

As shown in FIG. 1, each of the stator coils U, V, W of the brushless motor 1 is drawn out of the brushless motor 1 and connected to the drive device 2. The drive device 2 has a control apparatus 10 that performs a specified process according to the input of the drive signal. The output of the control apparatus 10 is connected to the three-phase inverter 12 through the pre-driver 11. The three-phase inverter 12 is connected to the power source 3, and is configured such that the stator coils U, V, W are energized according to the output of the control apparatus 10. Also, the analog waveform of induced voltage that appears in each of the stator coils U, V, W by the current from the three-phase inverter 12 energizing the brushless motor 1 becomes the input to the induced voltage I/F (interface circuit 14 after the voltage drops in the voltage dividing circuit 13. The induced voltage I/F circuit 14 generates the electric potential of the neutral point of the star connection as the standard voltage (equivalent neutral point voltage) from the voltage (induced voltage) of each of the stator coils U, V, W. The waveform of the induced voltage of each of the stator coils U, V, W, and the equivalent neutral point voltage are input to each of the comparators so as to generate digital signals. The output of each comparator is connected to the control apparatus 10.

The functions of the control apparatus 10 may be divided among the start processing unit 21 into which the drive signal is input, the mask processing unit 22 connected to the induced voltage I/F circuit 14, the energizing current timing generation processing unit 23 that receives the specified data from the mask processing unit 22, the pulse width detection unit 24, and the advance angle correction unit 25 that performs the processes following the pulse width detection unit 24. Data can be input from the start processing unit 21 and the advance angle correction unit 25 in addition to the mask processing unit 22 to the energizing current timing generation processing unit 23. The output of the energizing current timing generation processing unit 23 is connected to the pre-driver 11. This kind of control apparatus 10, may be realized for example, by a single-chip micro-computer.

The functions of the mask processing unit 22 may be classified as an edge detection device 30 that detects the changes in the induced voltage signals of stator coils U, V, W; a state detection device 31 that detects the state of the induced voltage of the stator coils U, V, W from the magnitude of the voltage level; and a mask signal generating device 32 that generates a mask signal based on the results of detection of the edge detection device 30 and the state detection device 31. The operations of each of these devices are described hereafter.

Next, the operations of this embodiment are described below.

First, referring to FIG. 2, the relationship between the pattern of energizing current flowing from the drive device 2 to the brushless motor 1 and the induction state of stator 5 and rotor 6 of the brushless motor 1 is described first. FIG. 2 illustrates a 120°-rectangular wave energizing current drive operation using an interlocking-type brushless motor.

As shown in FIG. 2, there are six energizing current patterns (#1 to #6) obtained by combining the three stator coils U, V, and W. The energizing current pattern #1 flows from stator coil W to stator coil V. The stator 5 and the rotor 6 change to the induction state shown in pattern [A] is obtained when the energizing current pattern is switched to energizing current pattern #1. When the energizing current pattern #1 is sustained, pattern [B] shows the state when torque has occurred in rotor 6 and it has rotated through an electrical angle of 30° from the position of pattern [A] in the CCW direction. At this stage, the center of the stator coil W (open phase) and the center of the south pole of the rotor 6 are physically opposite to each other. Electrically, the state is an intersection of the equivalent neutral point voltage and the induced voltage. This kind of state is taken as the timing to detect the position of rotation of the rotor 6. Moreover, pattern [C] is the state when the rotor 6 has rotated by an electrical angle of 30° from the pattern [B]. This pattern [C] indicates the instant the energizing current pattern #2 has been switched. Thus, if the energizing current pattern is switched at the timing at which the rotor 6 has rotated by an electrical angle of only 30° from the timing at which the position of rotation of rotor 6 was detected, then the rotor 6 can be rotated by the rotating magnetic field generated by the stator coils U, V and W. If the energizing current patterns #1 to #6 are switched sequentially this way, then the rotor 6 rotates with respect to stator 5 as the induction state moves sequentially from pattern [A] to pattern [L]. Patterns [B], [D], [F], [H], [J], [L] indicate the timings for detecting all the positions of rotation of rotor 6, and the torque generated at this stage is the maximum torque.

Here, the handling of the brushless motor 1 at the start is described. In the brushless motor 1 with no position detection sensor, the position of the rotor 6 at start cannot be identified. Thus, the energizing current timing generation processing unit 23 is controlled (initial operation) such that the start processing unit 21 outputs the specified energizing current pattern for a fixed period of time. As a result, the rotor 6 is locked at a position matching its energizing current pattern, and the initial position of the rotor 6 is established. For example, if the energizing pattern #5 is implemented as the initial operation, the rotor 6 is locked at the position indicated by pattern [M], and as a result, the initial position is established. For the sustaining time at this stage, the value set beforehand corresponding to the physical frame of the brushless motor 1 or the inertia load is used. Subsequently, the energizing pattern after skipping one pattern following the existing energizing pattern is implemented (skipped energizing pattern). In the previous example, the next pattern after the energizing pattern #5 should be pattern #6, but since a skipped energizing pattern is to be implemented, the energizing pattern #1 will be implemented. The reason for skipping the energizing pattern #6 is that even if the energizing pattern #6 is implemented, because the position of the pattern [J] at which the maximum torque at the locked position of the pattern [M] can be obtained, has already been crossed, the induced voltage at the maximum torque, which becomes the position data, cannot be obtained. Consequently, by implementing pattern #1, the same torque is generated as when moving from pattern [M] to pattern [A] and from pattern [L] to pattern [A]. In this way, when the induced voltage reaches a constant level after the rotor 6 is rotated and the position data is obtained, the usual operation can be continued as-is and feedback control can be performed. In contrast, when the induced voltage has not reached a constant level, the position data cannot be obtained; therefore, after implementing the initial operation with the energizing pattern #1, the skipped energizing pattern is implemented with energizing pattern #3. Thereafter, a similar procedure is repeated until the normal operation is enabled.

Figure 3:
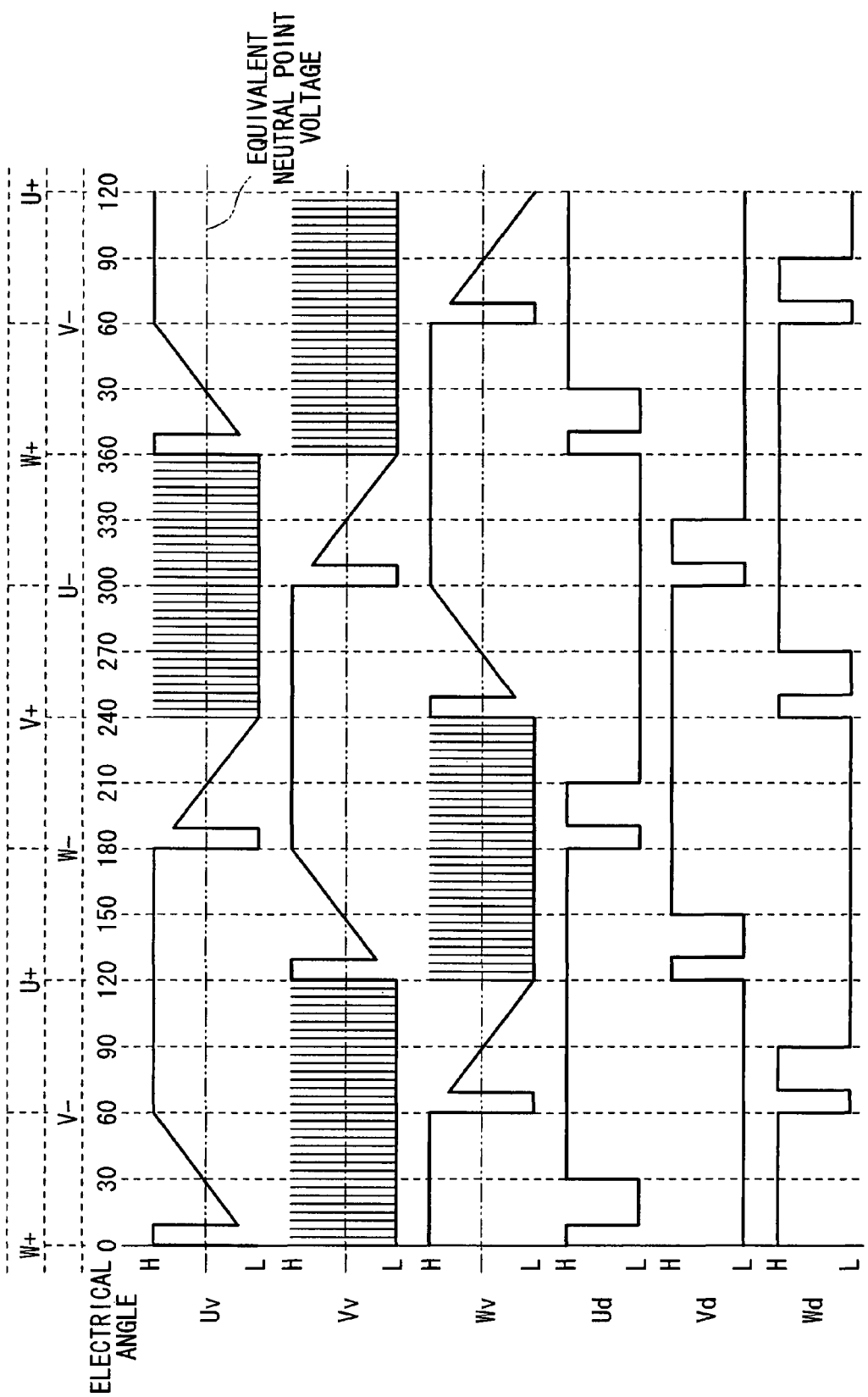
FIG. 3 is an explanatory drawing of the signal processing of induced voltage waveform of the stator coil in the first embodiment of the present invention, and is also a timing chart showing the procedure for generating a digital signal from an analog signal.
Figure 4:
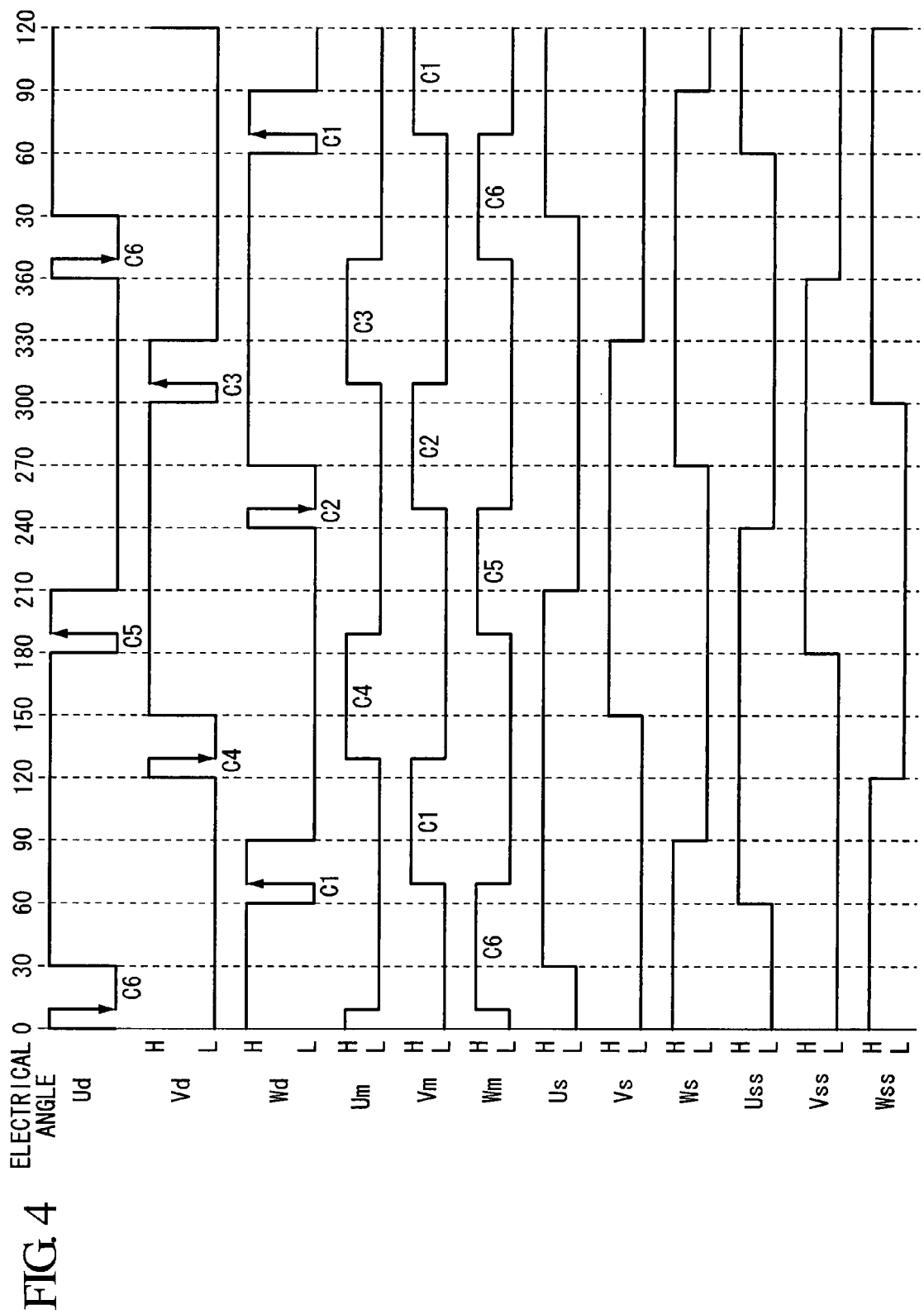
FIG. 4 is an explanatory drawing of the signal processing of induced voltage waveform of the stator coil in the first embodiment of the present invention and the procedure for generating mask signal, and is also a timing chart showing the procedure for generating a position detection signal after mask processing.

Next, the control of energizing current during normal operation is described referring mainly to FIG. 1, FIG. 3 and FIG. 4.

In FIG. 3, the electrical angle is taken on the horizontal axis, the energizing current state of each stator coil U, V, W from the upper side is taken on the vertical axis. The actual induced voltage waveforms Uv, Vv, Wv (analog signal) of each stator coil U, V, W and the induced voltage signals Ud, Vd, Wd (digital signal) of each stator coil are also illustrated. The state of energizing of each stator coil U, V, W of the uppermost stage shows that the stator coils U, V, W affixed with "+" to the upper stage, are on the high potential side, while the stator coils U, V, W with "−" affixed to the lower stage are on the low potential side. That is, "W+" and "V−" between the electrical angles of 0° and 60° indicate energizing from the stator coil W to the stator coil V (equivalent to the energizing pattern #1 in FIG. 2). Moreover, the induced voltage waveforms Uv, Vv, Wv are illustrated by superimposing the equivalent neutral point voltage as virtual line. Furthermore, for example, the pulse that starts up with an electrical angle of 0°, or the pulse that starts up with an electrical angle of 180° is a spike voltage in the induced voltage waveform Uv; these spike voltages are signals that are to be removed in this embodiment.

The induced voltage waveforms Uv, Vv, Wv of the stator coils U, V, W are input to the induced voltage I/F circuit 14 (see FIG. 1). The equivalent neutral point voltage can be obtained from these voltage values. If this equivalent neutral point voltage and the induced voltage waveform Uv are input to the comparator, the induced voltage signal Ud can be obtained. Similarly, the induced voltage signals Vd, Wd, which are digital signals, can be obtained from the induced voltage waveforms Vv, Vw, which are analog signals and from the equivalent neutral point voltage. These induced voltage signals Ud, Vv, Wv are input to the mask processing unit 22 of the control apparatus 10, and the mask signal is generated.

FIG. 4 is a schematic diagram showing the generation process of the mask signal and the generation process of the position detection signal. In FIG. 4, the electrical angle is taken on the horizontal axis, and from the upper side, the induced voltage signal Ud, Vd, Wd of each stator coil U, V, W, and the mask signal Um for stator coil U, the mask signal Vm for the stator coil V, the mask signal Wm for the stator coil W, and the position detection signals Us, Vs, Ws of each stator coil U, V, W after masking, and the position detection signals Uss, Vss, Wss after electrical angle 30° phase shift are sequentially illustrated on the vertical axis.

When the three induced voltage signals Ud, Vd, Wd are input, the mask processing unit 22 of the control apparatus 10 detects the leading edge and the trailing edge of each induced voltage signal Ud, Vd, Wd with the edge detection device 30. Similarly, the voltage levels of each of the induced voltage signals Ud, Vd, Wd are detected with the state detection device 31. The results of detection by the edge detection device 30 and the state detection device 31 are input to the mask signal generating device 32. The mask signal generating device 32 generates the mask signal while referring to the mask signal generating conditions registered beforehand in memory.

Table 1 summarizes the specific examples of mask signal generating conditions.

TABLE 1

| Condition | Induced Voltage Signal | | | Mask Signal | | |
|---|---|---|---|---|---|---|
| | Ud | Vd | Wd | Um | Vm | Wm |
| C1 | H | L | ↑ | L* | L→H(↑) | H→L(↓) |
| C2 | L | H | ↓ | L* | L→H(↑) | H→L(↓) |
| C3 | L | ↑ | H | L→H(↑) | H→L(↓) | L* |
| C4 | H | ↓ | L | L→H(↑) | H→L(↓) | L* |
| C5 | ↑ | H | L | H→L(↓) | L* | L→H(↑) |
| C6 | ↓ | L | H | H→L(↓) | L* | L→H(↑) |

The conditions C1 to C6 in Table 1 indicate the mask signal generating conditions. For example, in condition C1, if the induced voltage signal Wd is the leading edge (T), the induced voltage signal Ud is H (High), and the induced voltage signal Vd is L (Low), the mask signal Wm for the stator coil W is changed from L level to H level, and the mask signal Um is maintained at the L level. Furthermore, the mask signal Wm is changed from the H level to the L level. Here, the "*" in Table 1 indicates that the level is maintained. Similarly, condition C2 indicates the condition when the induced voltage signal Wd is a trailing edge (↓).

Detailed examples of processing by the mask processing unit 22 are given below. When the electrical angle increases from 0° in FIG. 4, the trailing edge that rapidly goes from H level to L level with the induced voltage signal Ud initially, is detected by the edge detection device 25. The signal indicating that it is the trailing edge of the induced voltage signal Ud is output to the mask signal generating device 27. At the same time, information indicating the voltage levels of each of the induced voltage signals Ud, Vd, Wd is input from the state detection device 26 to the mask signal generating device 27. Consequently, the mask signal generating device 27 examines the induced voltage levels of the remaining two stator coils V, W when the induced voltage signal Ud is taken as the induced voltage of the specific stator coil U. In this case, the induced voltage Vd is at the L level while the induced voltage Wd is at the H level. This state corresponds to the condition C6 in Table 1. Thus, the mask signal Wm for the stator coil W is set at the H level, while the mask signal Um for the stator coil U is set at the L level.

Moreover, the mask signal Vm for the stator coil V is maintained at the L level.

Next, for an electrical angle of 30°, the leading edge of the induced voltage signal Ud can be detected, but since the level of induced voltage signal Vd, Wd does not satisfy the condition C5, the settings of mask signals, Um, Vm and Vm do not change. Similarly, the trailing edge of the induced voltage signal W of the electrical angle of 60° does not satisfy the condition C2; thus, the settings of mask signal Um, Vm, Wm do not change. The leading edge of the induced voltage signal W that appears between the electrical angles of 60° and 90° satisfies the condition C1; therefore, the mask signal Vm is set to H, and the mask signal Wm is set to the L level. Moreover, the mask signal Um is set to the L level. As a result, the mask signal Wm becomes the mask of the pulse width corresponding to the electrical angles from the condition C6 to the condition C1.

In a similarly way, the mask signals Um, Vm, Wm are generated. The mask signal Um includes pulse that rises with the condition C4 and pulse that falls with the condition C5, and pulse that rises with the condition C3 and falls with the condition C6. The mask signal Vm includes pulse that rises with the condition C1 and pulse that falls with the condition C4, and pulse that rises with the condition C2 and falls with the condition C3. The mask signal Wm includes pulse that rises with the condition C6 and pulse that falls with the condition C1, and pulse that rises with the condition C5 and falls with the condition C2.

While the mask signal Um is in the H level, and if the changes in the induced voltage waveform Uv are ignored, then the position detection signal Us can be obtained. Similarly, the position detection signal Vs can be obtained from the mask signal Vm and the induced voltage Vv, and the position detection signal Ws can be obtained from the mask signal Wm and the induced voltage Wv. These position detection signals Us, Vs, Ws are output from the mask processing unit 22 to the energizing current timing generation processing unit 23. The energizing current timing generation processing unit 23 advances the phase of each of the position detection signals Us, Vs, Ws by electrical angle 30° only, and generates the position detection signals Uss, Vss and Wss. These position detection signals Uss, Vss, Wss are equivalent to the signals obtained when a position detection sensor is installed. The energizing current timing generation processing unit 23 controls the switching timing of the current energizing each of the stator coils U, V, W, based on the position detection signals Uss, Vss, Wss. The result is that the rotor 6 of the brushless motor 1 rotates, as shown in FIG. 2.

Figure 5:
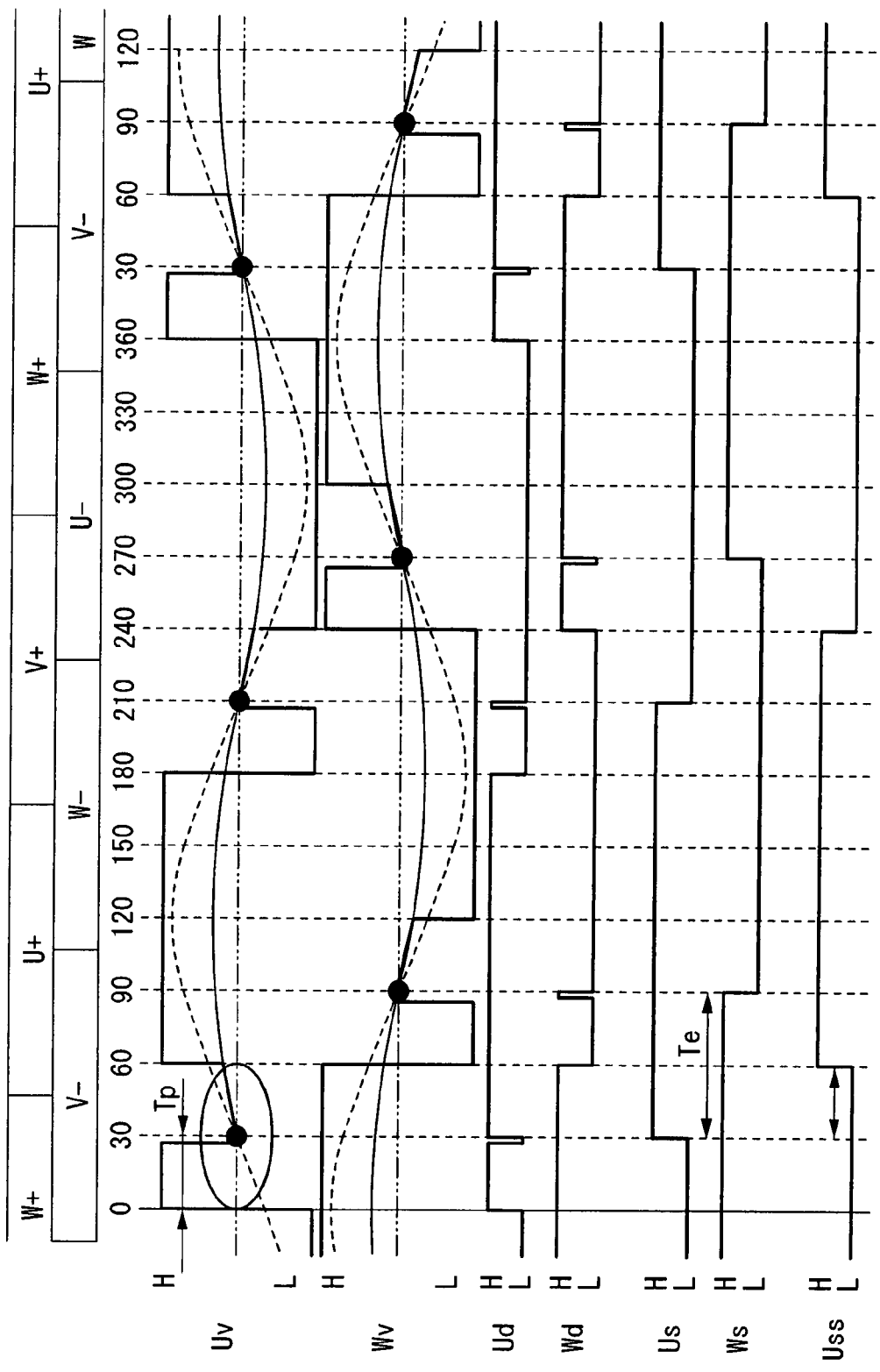
FIG. 5 is a timing chart showing the signal of induced voltage waveform of the stator coil at heavy load and when the rpm has increased in the first embodiment of the present invention.

Moreover, operation at heavy loading and the state of increase in the rpm are shown in FIG. 5. In FIG. 5, the electrical angle is taken on the horizontal axis, while the induced voltage waveforms Uv, Wv of the stator coils U, W, the position detection signals Us, Ws after masking the stator coils U, W, and the position detection signal Uss after advance angle correction are shown sequentially from the upper side of the vertical axis. In FIG. 5, only two-phase parts generated continuously by the energizing current switching timing are illustrated from the three stator coils U, V, W. The processing of these two phases will be explained below but it is to be noted that the invention is not limited to the combination of two phases. In the induced voltage waveforms Uv, Wv shown in FIG. 5 the waveforms of rated induced voltage are shown in broken line, while the waveform of induced voltage during heavy load is illustrated by bold line.

The pulse width Tp of the spike voltage becomes large in FIG. 5, and its trailing edge approaches the intersection of the equivalent neutral point and the induced voltage. If the pulse width Tp becomes larger than this and the intersection of the equivalent neutral point and the induced voltage becomes hidden by the spike voltage, the generation of the induced voltage signals Ud, Vd, Wd can no longer be implemented and position detection is not possible. In this way, if the pulse width of the spike voltage becomes larger than during steady-state operation, advance angle correction is implemented by the pulse width detection unit 24 and the advance angle correction unit 25, and the energizing current timing generated by the energizing current timing generation processing unit 23 is changed.

First, the mask processing unit 22 masks the spike voltage and generates the position detection signals Us, Ws, similar to the procedure mentioned earlier. The mask processing unit 22 hands over the position detection signals Us, Ws, to the energizing current timing generation processing unit 23, and hands over the induced voltage signals Ud, Wd to the pulse width detection unit 24. The pulse width detection unit 24 counts the pulse width Tp of the spike voltage, and hands over the count value to the advance angle correction unit 25. The advance angle correction unit 25 calculates half the value of the pulse width Tp, and hands it over to the energizing current timing generation processing unit 23 as the advance angle correction value. A detailed example of processing to half the value is the 1-bit shift of the count value of the pulse width Tp.

The energizing current timing generation processing unit 23 counts the edge interval Te of the position detection signal Us and the position detection signal Ws, as the energizing current switching interval, and calculates the value of half this edge interval. A detailed example of processing to half the value is the 1-bit shift of the count value of the edge interval Te. The advance angle correction value (half the value of the pulse width Tp) is subtracted from half the value of the edge interval, and the calculated result (=(½)×Te−(½)×Tp) is taken as the phase shift amount θ. The position detection signals Us, Vs, Ws of each of the stator coils U, V, W are taken as position detection signals Uss', Vss', Wss' advanced by only the phase shift amount θ. The current energizing each of the stator coils U, V, W is switched according to these position detection signals Uss', Vss' and Wss'.

Figure 6:
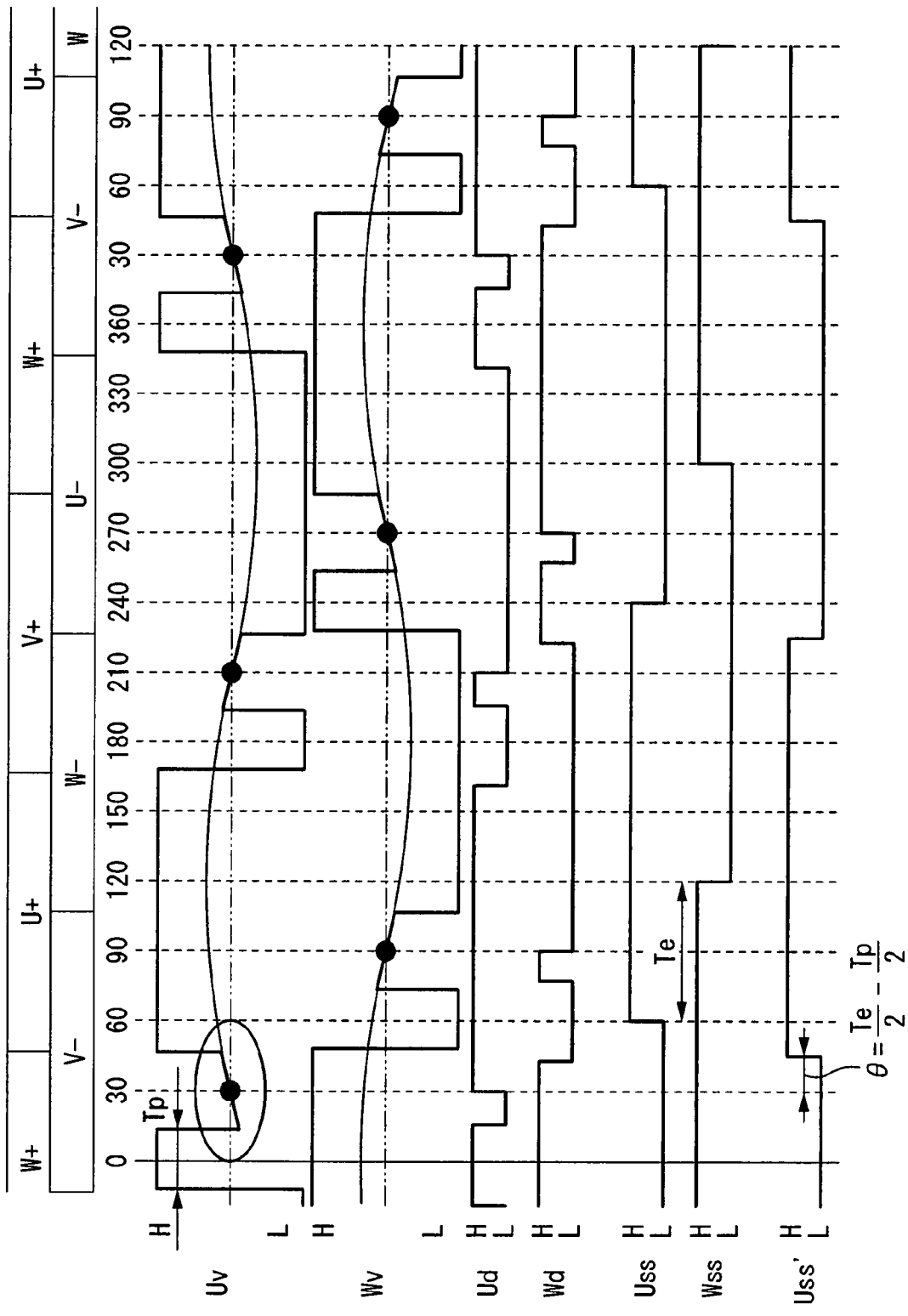
FIG. 6 is a timing chart showing the signal of the induced voltage waveform of the stator coil after advance angle correction has been performed from the state in FIG. 5, in the first embodiment of the present invention.

The results after performing the advance angle correction in this way, are shown in FIG. 6. In FIG. 6 the advance angle is taken on the horizontal axis, while the induced voltage waveforms, Uv, Wv after advance angle correction, and the induced voltage signals Ud, Wd are arranged sequentially on the vertical axis. For comparison, the position detection signals Uss, Wss before the advance angle correction and the detection signals Uss' after the advance angle correction are also illustrated on the vertical axis. Similarly, signals after advance angle correction are generated for the position detection signals Vss', Wss' not illustrated in the figure above.

By advancing all the induced voltage waveforms Uv, Wv, the equivalent neutral point will be positioned at the center of the area in which the induced voltage varies with a substantial inclination. Accordingly, even if the pulse width Tp of the spike voltage is increased by increasing the load or the speed from this state, the intersection of the equivalent neutral point and the induced voltage is not likely to be hidden, so the position detection can be continuously performed. As shown in FIG. 6, the advance angle of the waveform finally becomes Tp/2, that is, half the pulse width of the spike voltage occurring in the flywheel voltage.

According to this embodiment, the timing varying device is constituted by the energizing current timing generation processing unit 23, the pulse width detection unit 24 and the advance angle correction unit 25, and advance angle correction of the position detection signal is performed using the pulse width Tp of the spike voltage. Therefore, even if the pulse width Tp of the spike voltage increases when the load in the brushless motor 1 increases or the rpm increases, the intersection of the equivalent neutral point voltage and the induced voltage waveforms Uv, Vv, Wv can be correctly acquired. For this reason, the spike voltage is properly masked by the mask signals Um, Vm, Wm generated from the induced voltage waveforms Uv, Vv, Wv, and the position detection signals Us, Vs and Ws can be generated. Consequently, the position detection signals Uss', Vss', Wss' can be properly generated without depending on the rpm or the load, and the ability to resist loss of synchronism of the brushless motor 1 can be enhanced.

Next, a second embodiment of the present invention is described below. Only the arithmetic processing of the advance angle varies in this embodiment; other components and operations are the same as in the first embodiment.

Figure 7:
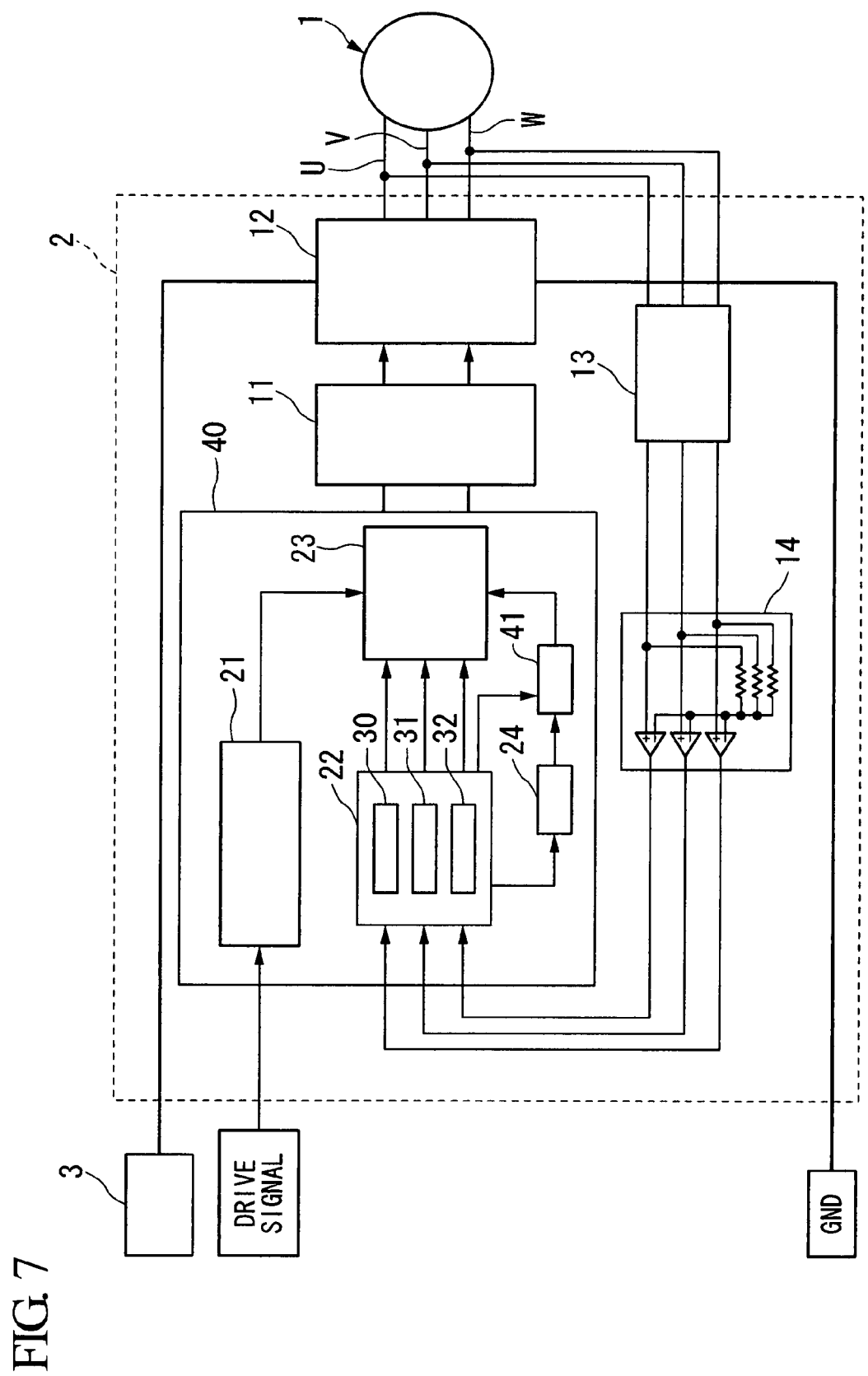
FIG. 7 is a block diagram that shows the motor system including the brushless motor control apparatus according to a second embodiment of the present invention.

As shown in FIG. 7, the functions of the control apparatus 40 can be divided among the start processing unit 21, the mask processing unit 22, the energizing current timing generation processing unit 23, the pulse width detection unit 24, and the advance angle calculation unit 41. The advance angle calculation unit 41 is configured to accept data input from the mask processing unit 22 and the pulse width detection unit 24, to calculate the advance angle, and to output it to the energizing current timing generation processing unit 23.

Next, the operations of this embodiment are described here. First, the advance angle calculation unit 41 receives the position detection signals Us, Vs, Ws after masking from the mask processing unit 22, and also receives the count value of the pulse width Tp of the spike voltage from the pulse width detection unit 24. Next, the advance angle calculation unit 41 counts the edge intervals of the position detection signals Us, Ws, subtracts the pulse width Tp from this count value and calculates half of this amount. The result is that the same phase shift amount θ as the first embodiment is obtained. This phase shift amount θ is output to the energizing current timing generation processing unit 23. The energizing current timing generation processing unit 23 advances the position detection signals Us, Vs, Ws by only the phase shift amount θ, generates the position detection signals Uss', Vss', Wss', and switches the timing of the energizing current from the three-phase inverter 12.

Also, the advance angle calculation unit 41 may stop the counter or timer of the edge interval Te by only the pulse width TP instead of subtracting the pulse width Tp from the edge interval Te. In this case, the advance angle calculation unit 41 receives the position detection signals Us, Vs, Ws after masking and the induced voltage signals Ud, Vd, Wd from the mask processing unit 22, and also receives the count value of the pulse width Tp of the spike voltage from the pulse width detection unit 24. Next, the advance angle calculation unit 41 stops the counter or timer for measurement of the edge interval Te for a period of only the pulse width Tp. As a result, if the obtained count value is halved, the shift phase amount θ can be obtained.

Furthermore, to explain the process here in more detail, the advance angle calculation unit 41 stops the counter or the timer only for the period the conditional equation (1) is satisfied.

$$((Ud\char`\^Us)|(Vd\char`\^Vs)|(Wd\char`\^Ws))=1 \qquad (1)$$

Here, "^" indicates the logical operator "EXOR" while "|" indicates the logical operator "OR." This conditional equation (1) is saved in memory beforehand. For example, when counting the edge interval Te, the counter or the timer is stopped only for the interval the high and low voltage levels are reversed ((Ud^Us)=1) between the induced voltage signal Ud and the position detection signal Us after masking. The period this condition is satisfied is equivalent to the pulse width Tp of the spike voltage; therefore, if half this count value is acquired, the shift phase amount θ can be obtained.

According to this embodiment, the timing varying device is constituted by the energizing current timing generation processing unit 23, the pulse width detection unit 24 and the advance angle calculation unit 41. By stopping the counter or the timer for measuring the period of rotation of say the edge interval when deciding the amount of advance, by only the pulse width of the spike voltage, the advance amount can be determined. Therefore, the circuit configuration and the process can be simplified compared to the case when the edge interval and the pulse width are separately counted and these values are calculated after they are stored.

The other effects are the same as those for the first embodiment.

In the above-mentioned embodiment, the mask signals Um, Vm, Wm may be generated based on the position detection signals Uss, Vss, Wss when switching the current energizing the stator coils U, V, W and on the position detection signals Uss', Vss', Wss'. The pulse width of the mask signal may be of a magnitude corresponding to the preset electrical angle.

Next, the third embodiment of the present invention is described below in detail referring to the drawings. The same reference numbers are affixed to the same configuration elements as in the first and the second embodiments; so their explanations are omitted here.

Figure 8:
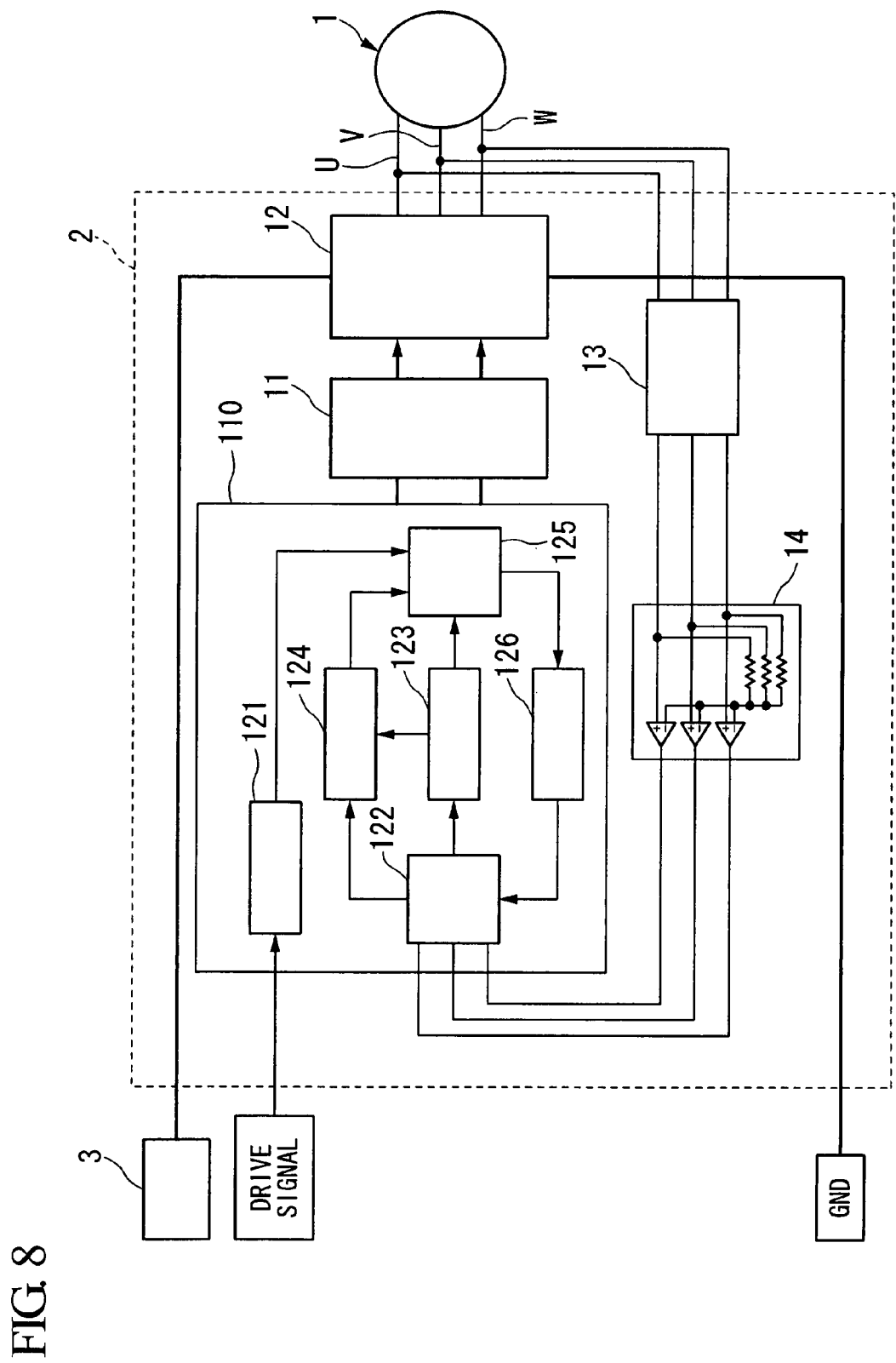
FIG. 8 is a block diagram that shows the motor system including the brushless motor control apparatus according to a third embodiment of the present invention.

In the motor system including the brushless motor related to the third embodiment indicated in FIG. 8, the configuration of the control apparatus 110 differs from that in the first embodiment.

The functions of the control apparatus 110 can be classified as the start processing unit 121 to which the drive signal is input; the edge separation processing unit 122 connected to the induced voltage I/F circuit 14, the rotor position detecting unit 123 that generates the signal to detect the rotating position of the rotor 6; the stop processing unit 124 that performs processing during an overload, the energizing current switching timing generation unit 125, and the mask signal generation unit 126 that generates the mask signal to remove the spike voltage. Signals are output from the edge separation processing unit 122 to the rotor position detecting unit 123 and the stop processing unit 124. Signals are output from the rotor position detecting unit 123 to the stop processing unit 124 and the energizing current switching timing generation unit 125. Moreover, signals are output from the start processing unit 121 and the stop processing unit 124 to the energizing current switching timing generation unit 125. Signals are fed back to the edge separation processing unit 122 through the mask processing unit 126 from the energizing current switching timing generation unit 125 so that finally the information on switching timing is output to the pre-driver 11. The functions of each part are described here in detail. This kind of control apparatus 110, may be realized for example, by a single-chip micro-computer.

Next, the operations of this embodiment are described here.

The relationship between the energizing current pattern energizing the brushless motor 1 from the drive device 2 and the induction state of the stator 5 and rotor 6 of the brushless motor 1 is the same as described using FIG. 2.

The handling of the brushless motor 1 at start is performed by controlling (initial operation) the energizing current timing generation processing unit 125 such that the start processing unit 121 outputs the specified energizing current pattern at a fixed time. As a result, the rotor 6 is locked at a position matching its energizing current pattern, and the initial position of the rotor 6 is established. Subsequently, the handling of the brushless motor 1 at start is similar to the procedure described for the first embodiment. The switching timing of the energizing current at start may be generated by analog-type synchronizing operation.

Figure 9:
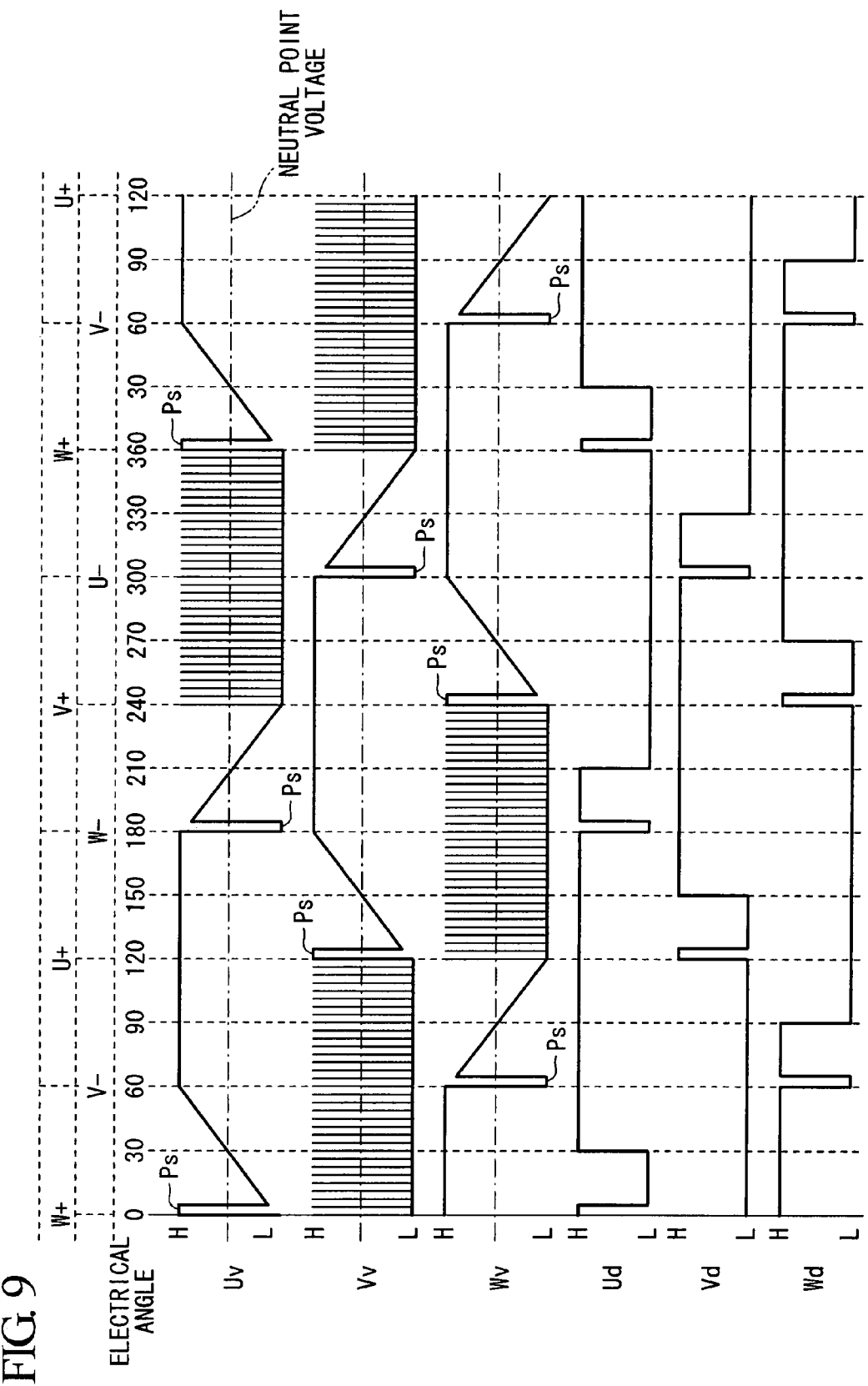
FIG. 9 is an explanatory drawing of the signal processing of induced voltage waveform of the stator coil in the third embodiment of the present invention, and is also a timing chart showing the procedure for generating a digital signal from an analog signal.
Figure 10:
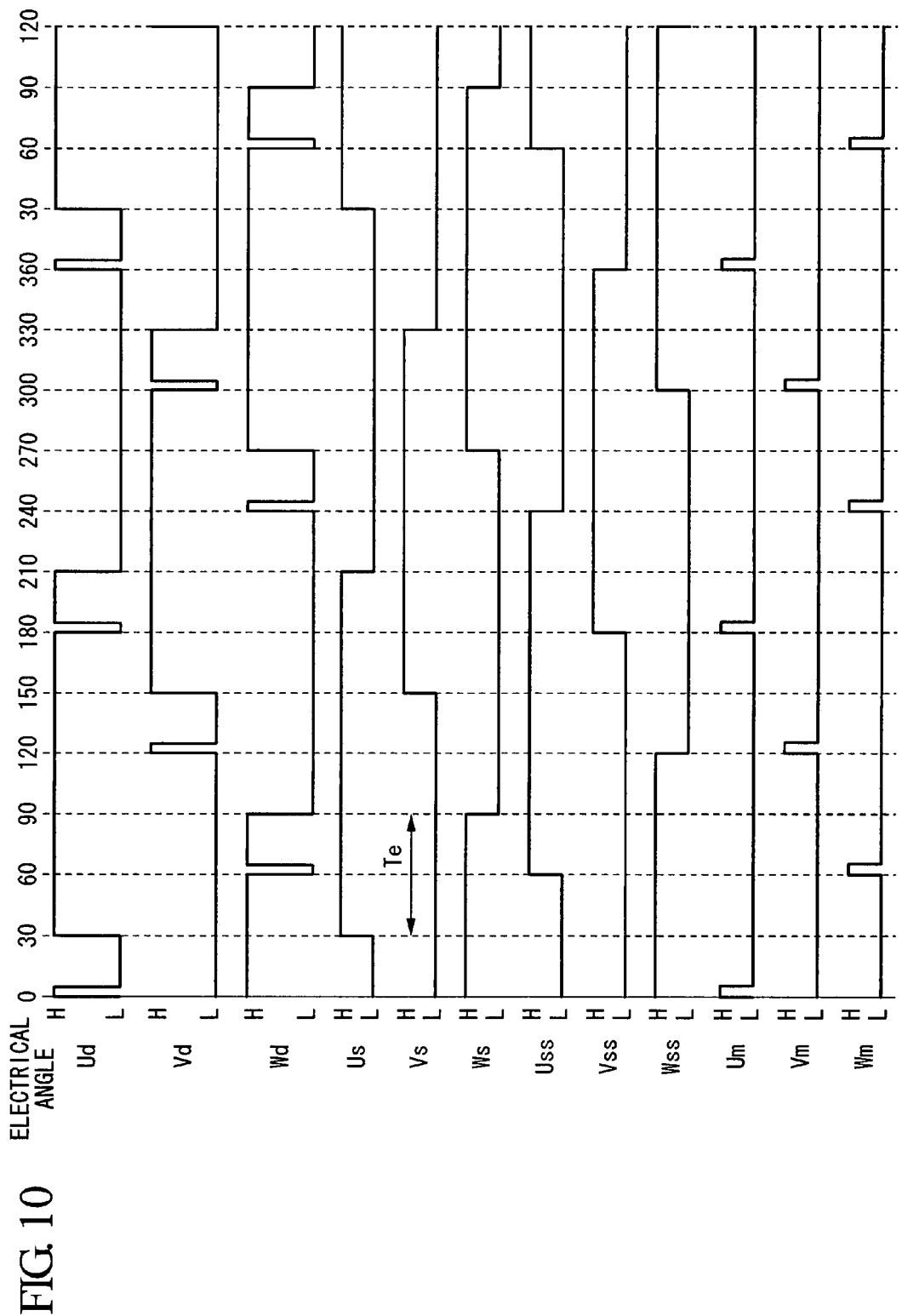
FIG. 10 is an explanatory drawing of the signal processing of induced voltage waveform of the stator coil in the third embodiment of the present invention and the procedure for generating a mask signal, and is also a timing chart showing the procedure for generating a position detection signal after mask processing.

Next, the control of energizing current during normal operation is described referring mainly to FIG. 8, FIG. 9 and FIG. 10.

In FIG. 9, the electrical angle is taken on the horizontal axis, the energizing current state of each stator coil U, V, W, the actual induced voltage waveforms Uv, Vv, Wv (analog signals) of each stator coil U, V, W and the induced voltage signals Ud, Vd, Wd (digital signal) of each stator coil U, V, W are also illustrated from the upper side on the vertical axis. The state of energizing of each stator coil U, V, W of the uppermost stage shows that the stator coils U, V, W affixed with "+" to the upper stage, are on the high potential side, while the stator coils U, V, W with "−" affixed to the lower stage are on the low potential side. That is, "W+" and "V−" between the electrical angles of 0° and 60° indicate energizing from the stator coil W to the stator coil V (equivalent to the energizing pattern #1 in FIG. 2). Furthermore, for example, the pulse that starts up with an electrical angle of 0°, or the pulse that starts up with an electrical angle of 180° is a spike voltage Ps in the induced voltage waveform Uv. These spike voltages Ps are signals that are to be removed in this embodiment.

FIG. 10 is a schematic diagram showing the generation process of the mask signal and the generation process of the position detection signal. In FIG. 10, the electrical angle is taken on the horizontal axis, while the induced voltage signals Ud, Vd, Wd (same signals as in FIG. 9) of each of the stator coils U, V, W, the position detection signals Us, Vs, Ws of the stator coils U, V, W, and the position detection signals Uss, Vss, Wss after a 30° electrical angle phase shift, the mask signal Um for the stator coil U, the mask signal Vm for the stator coil V, and the mask signal Wm for the stator coil W are sequentially displayed from the upper side on the vertical axis.

The induced voltage waveforms Uv, Vv, Wv of each of the stator coils U, V, W shown in FIG. 9 are input to the induced voltage I/F circuit 14 (see FIG. 8), and the equivalent neutral point voltage is obtained from these voltage values. If this equivalent neutral point voltage and the induced voltage waveform Uv are input to the comparator, the induced voltage signal Ud can be obtained. Similarly, the induced voltage signals Vd, Wd of the digital signal can be obtained from the induced voltage waveforms Vv, Wv of the analog signal. These induced voltage signals Ud, Vv, Wv are input to the edge separation processing unit 122 of the control apparatus 110, and the energizing current switching timing is generated by the process described below.

First, the edge separation processing unit 122 separates the induced voltage edge generated by the rotation of the rotor 6 and the edge of the spike voltage Ps from the pulse signals of the induced voltage signals Ud, Vv, Wv. The rotor position detecting unit 123 generates the position detection signals Us, Vs, Ws from the information of induced voltage generated by rotating the rotor 6, and hands it over to the energizing current switching timing generation unit 125. The energizing current switching timing generation unit 125 counts the interval Te of the edge (induced voltage edge) of the position detection signals Us, Vs, Ws shown in FIG. 10. Specifically, the counter starts measurement of all the edges of the position detection signals Us, Vs, Ws as triggers; next, when the edge of any of the position detection signals Us, Vs, Ws is detected and the count value is cleared, the next count starts simultaneously. While the brushless motor 1 is rotating, the induced voltage edge interval Te is generated for each electrical angle of 60°, therefore the rotational speed and acceleration of the rotor 6 (see FIG. 2) are calculated from the count value showing the generated interval of the induced voltage, according to which the energizing current switching timing is estimated; a part proportional to this is phase shifted in the phase of position detection signals Us, Vs, Ws, and the phase detection signals Uss, Vss, Wss are generated. The control apparatus 110 controls the three-phase inverter 12 according to these phase detection signals Uss, Vss, Wss, and rotates the rotor 6 of the brushless motor 1 by switching the current energizing each of the stator coils U, V and W.

Here, the energizing current switching timing generation unit 125 outputs the signal commanding the switching of energizing current to the three-phase inverter 12, and at the same time outputs the position detection signals Us, Vs, Ws to the mask signal generation unit 126 immediately in front. The mask signal generation unit 126 receives the input of this position detection signal Us, Vs, Ws and generates the mask signal Um, Vm, Wm. For example, in the example shown in FIG. 10, the mask signal Wm of the stator coil W is set to the H (High) level at the generated timing equivalent to that of a specified electrical angle from the timing of the induced voltage edge of the position detection signal Us of the stator coil U. Similarly, the mask signal Um of the stator coil U is set to the H (High) level at the generated timing equivalent to that of a specified electrical angle from the timing of the induced voltage edge of the position detection signal Vs of the stator coil V. The mask signal Vm of the stator coil V is set to the H (High) level at the generated timing equivalent to that of a specified electrical angle from the timing of the induced voltage edge of the position detection signal Ws of the stator coil W. The signal level of each of these mask signals Um, Vm, Wm after maintained for a specified electrical angle are changed to a L (Low) level. The mask signals Um, Vm, Wm are input to the edge separation processing unit 122.

The electrical angle that decides the pulse width of the mask signals Um, Vm, Wm always calculates the angle saved in the memory beforehand from the measured value of Te. More specifically, a value larger than the pulse width of the spike voltage PS when rotated at the normal load, and which does not mask the intersection of the induced voltage waveforms Uv, Uv, Wv and the equivalent neutral point voltage with the pulse of the mask signal, and where 0°<θ<30° is used.

Subsequently, the pulse of the spike voltage Ps is removed by the mask signals Um, Vm, Wm corresponding to the induced voltage signals Ud, Vd, Wd input from the induced voltage I/F circuit 14, the position detection signals Us, Vs, Ws are generated, and the energizing current of the brushless motor 1 is controlled.

Here, the pulse width of the spike voltage Ps varies according to the magnitude of the load and the rotational speed. In contrast, the mask signals Um, Vm, Wm have constant pulse widths, so the pulse of the spike voltage Ps may be completely masked, or may not be masked by the mask signals Um, Vm, Wm. The processing of the edge separation processing unit 122 in these cases are described sequentially below.

Figure 11:
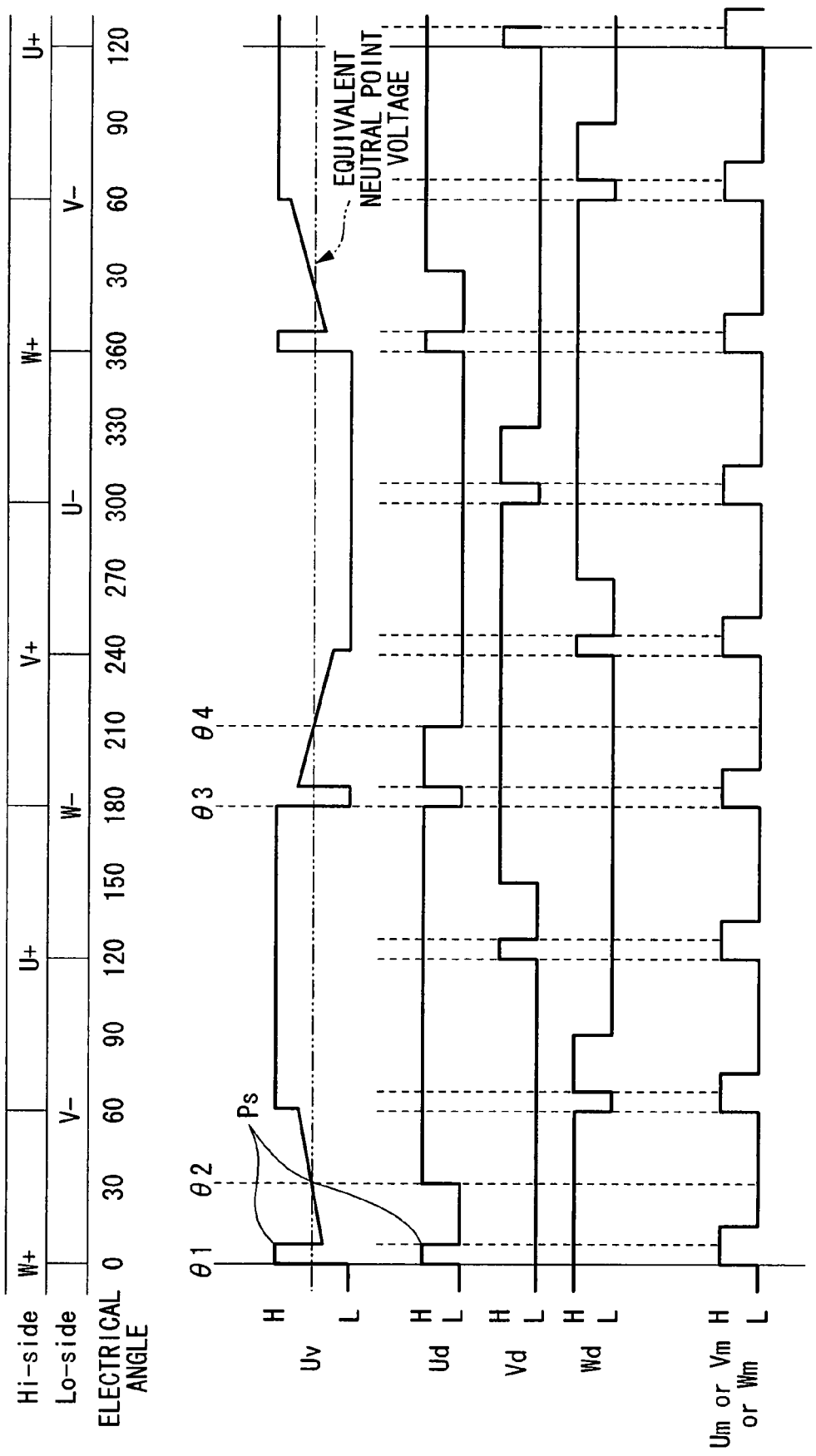
FIG. 11 is a timing chart that explains the judgment processing of induced voltage edge in the third embodiment of the present invention, and also shows the case when the pulse width of the spike voltage is below the pulse width of the mask signal.

First, when the pulse width of the spike voltage Ps is lower than the mask width, both the starting edge and the ending edge of the spike voltage Ps can be masked, as shown in FIG. 11. In this case, the rotor position detecting unit 123, generates the position detection signals Us, Vs, Ws from the induced voltage signals Ud, Vd, Wd, according to the induced voltage signal detection logic, as shown in Table 2.

TABLE 2

| Edge to be detected | | Level to be checked | | |
| --- | --- | --- | --- | --- |
| | | Ud | Vd | Wd |
| Leading edge | Ud | — | L | H |
| | Vd | H | — | L |
| | Wd | L | H | — |
| Trailing edge | Ud | — | H | L |
| | Vd | L | — | H |
| | Wd | H | L | — |

The leading edge and the trailing edge of the spike voltage Ps starting from the electrical angle θ1 in FIG. 11 are ignored since the mask signal UM is at the H level. The leading edge in the electrical angle θ2 satisfies the condition for induced voltage signal Ud of the leading edge of Table 2; therefore, it can be treated as the leading edge of the induced voltage of the stator coil U. Similarly, the trailing edge and the leading edge of the spike voltage Ps starting from the electrical angle θ3 can be ignored because the mask signal Um is at the H level. The trailing edge of the induced voltage signal Ud in the electrical angle θ4 satisfies the condition for the induced voltage signal Ud of the trailing edge of Table 2; therefore, it can be treated as the trailing edge of the induced voltage of the stator coil U. In the same way, for the other induced voltage signals Vd, Wd also, the leading edge and the trailing edge of the induced voltage can be judged according to the induced voltage signal detection logic of Table 2, and the position detection signals Us, Vs and Ws can be generated.

Figure 12:
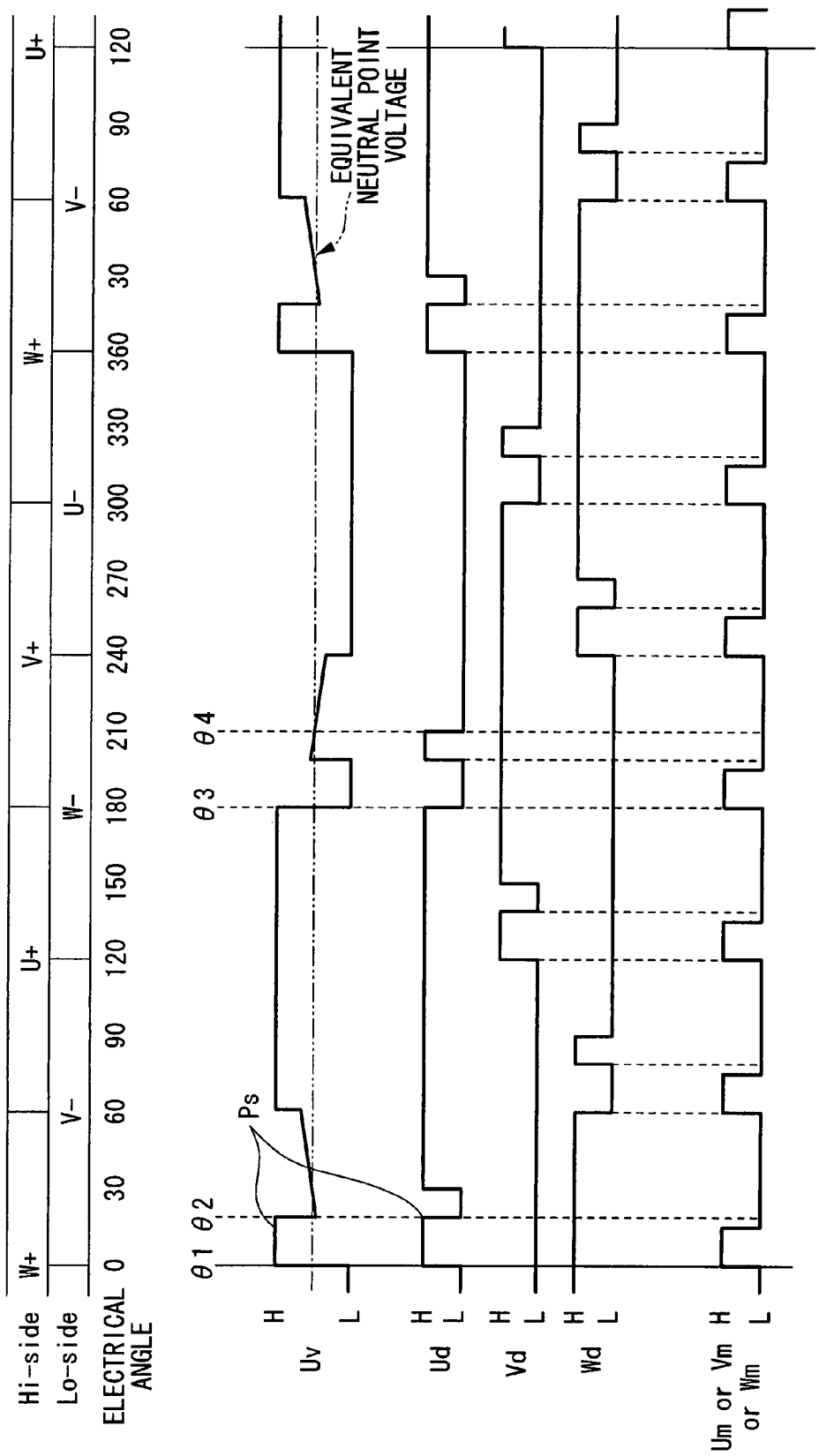
FIG. 12 is a timing chart that explains the judgment processing of induced voltage edge in the third embodiment of the present invention, and also shows the case when the pulse width of the spike voltage exceeds the pulse width of the mask signal.

In contrast, as shown in FIG. 12, when the pulse width of the spike voltage Ps exceeds the mask width, the starting edge of the spike voltage Ps can be masked, but the ending edge of the spike voltage Ps cannot be masked. In such cases, the rotor position detecting unit 123 separates the induced voltage edge referring to the spike voltage ending edge judgment logic as shown in Table 3, in addition to the induced voltage signal detection logic as shown in Table 2, and generates the position detection signals Us, Vs, Ws.

TABLE 3

| Edge to be detected | | Level to be checked | | |
| --- | --- | --- | --- | --- |
| | | Ud | Vd | Wd |
| Leading edge | Ud | — | H | L |
| | Vd | L | — | H |
| | Wd | H | L | — |
| Trailing edge | Ud | — | L | H |
| | Vd | H | — | L |
| | Wd | L | H | — |

In FIG. 12, the leading edge of the spike voltage Ps starting from the electrical angle θ1 is masked, but the trailing edge of the same spike voltage Ps cannot be masked; therefore, a check is made to confirm whether the conditions of trailing edge shown in Table 2 and Table 3 are satisfied or not. In this case, the conditions for the induced voltage signal Ud of the trailing edge of Table 3 are satisfied; therefore, it can be treated as being the edge of the spike voltage Ps. This signal is removed, and the position detection signal Us is generated. The edge of the electrical angle θ2 satisfies the conditions of Table 2 as mentioned above, so it is taken as the induced voltage edge. Similarly, the trailing edge of the spike voltage Ps that starts from the electrical angle θ3 is removed by the mask signal Um. The leading edge of the same spike voltage Ps satisfies the conditions related to the induced voltage signal Ud of the leading edge of Table 3, therefore, it is also removed. In this way, when a pulse of the spike voltage Ps that cannot be removed by the mask signal Um exists, the high and low voltage levels of other induced voltage signals Vd, Wd are examined and the necessity for removal is judged by checking the conditions of Table 2 and Table 3. Then the signal due to the spike voltage Ps is removed and the position detection signal Us is generated. In a similar manner, the position detection signals Vs and Ws are generated.

Next, the processing by the stop processing unit 124 of the control apparatus 110 is described here.

Figure 13:
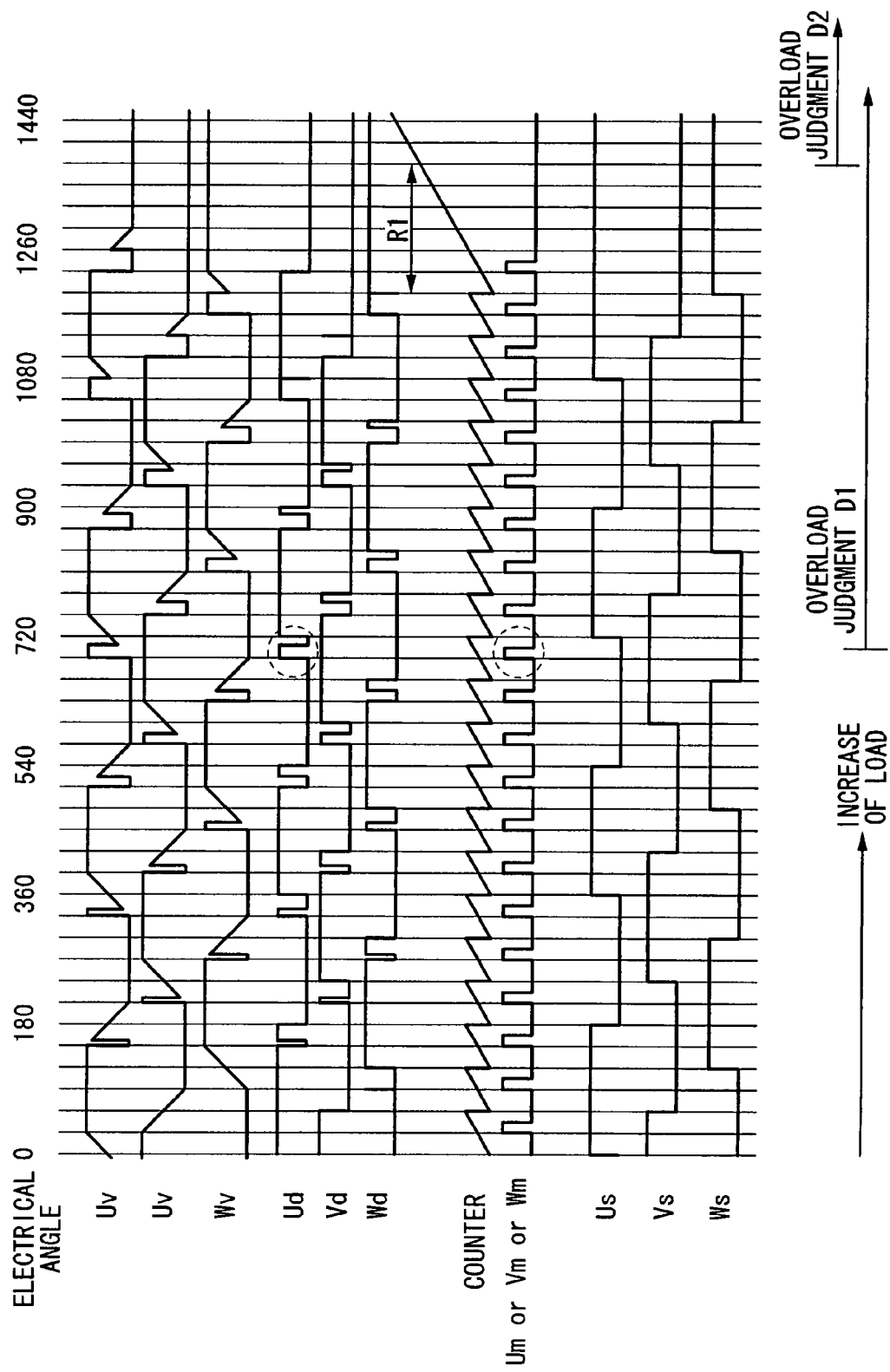
FIG. 13 is a timing chart that explains the judgment processing of induced voltage edge in the third embodiment of the present invention, and it explains the judgment processing during an overload.

As shown in FIG. 13, when the load on the brushless motor 1 is gradually increased, overload state of the brushless motor 1 is judged in this processing, and the brushless motor 1 is stopped. The processing is divided into two cases and described here: the case when the pulse of the spike voltage Ps in the steady state is changed from the maskable state to the load-increase state (load judgment D1) by the mask width of the mask signals Um, Vm, Wm generated by the mask signal generation unit 126, and the case when the pulse of the spike voltage Ps in the steady state is changed from the state where it cannot be masked to the load-increase state (load judgment D2).

First, the load judgment D1, that is, when the pulse width of the spike voltage Ps in the steady state is less than the mask width, the stop processing unit 124 judges by assuming the mask width as the threshold of the overload judgment. More specifically, when a pulse of the spike voltage exists that cannot be removed by the mask signals Um, Vm, Wm, the edge separation processing unit 122 hands over this signal to the stop processing unit 124. It is not clear whether such a pulse is due to the spike voltage Ps, or to the induced voltage; therefore, judgment is made by examining whether the conditions of Table 3 are satisfied or not. The result is that if the conditions of Table 3 are satisfied and it is clear that the signal is the edge of the spike voltage Ps, then the state is treated as the overload state. Consequently, the stop processing unit 124 outputs the command signal to stop to the energizing current timing switching generation unit 125, and the brushless motor 1 is stopped.

In contrast, the load judgment D2, that is if the pulse width of the spike voltage Ps in the steady state exceeds the mask width, the stop processing unit 124 judges the specified electrical angle 1 as the threshold value of the overload judgment. Here, for the specified electrical angle R1, the value set beforehand corresponding to the physical frame of the brushless motor 1 or the inertia load may be used, for example, a value of 360° may be set. As shown in FIG. 13, originally, when the induced voltage edge realized periodically cannot be detected by the rotor position detecting unit 123, the stop processing unit 124 examines the counter value that is reset each time the induced voltage edge is detected. The result is that the even if the counter value exceeds the value corresponding to the electrical angle R1, as long as it is not reset, the state will be treated as the overload state. Consequently, the stop processing unit 124 outputs the command signal to stop to the energizing current timing switching generation unit 125, and the brushless motor 1 is stopped.

According to this embodiment, the energizing current switching timing is calculated after detecting the induced voltage, and by feedback of this energizing current timing, the mask signals Um, Vm, Wm for masking the spike voltage Ps are generated. Therefore, regardless of the existence of the spike voltage Ps, the mask signals Um, Vm, Wm can always be generated. Consequently, even if the spike voltage Ps is generated at the stage when switching of the energizing current is repeated, the position of the rotor 6 can be accurately detected. Thus, the energizing current can be switched at the appropriate timing without depending on the type of the brushless motor 1 or the loading condition. Also, there is no need to install an external digital masking circuit separately for masking, therefore, the scale of the circuit can be made smaller.

In the embodiment described above, as a measure against the wide variation in the pulse width of the spike voltage during load variation, an advance angle correction device may be added to the control apparatus 110. The advance angle correction device subtracts the period of switching the energizing current from the pulse width of the spike voltage, and takes half the subtracted value as the advance angle correction value. The energizing current timing generation processing unit 125 takes the position detection signals Us, Vs, Ws, advanced only by the advance angle correction value as the position detection signals Uss, Vss, Wss, and controls the switching of the energizing current based on these signals.

The present invention is not limited by the embodiments described above, and appropriate changes may be effected to the present invention without departing from the spirit and scope of the present invention.

INDUSTRIAL APPLICABILITY

The present invention can be applied to control apparatus, and control method and motor system of brushless motors, without installing a special sensor in the brushless motor and to perform stable control of the energizing current.

The invention claimed is:

1. A brushless motor control apparatus comprising:
a drive circuit for obtaining a rotating magnetic field by energizing a plurality of stator coils disposed so as to apply a rotating magnetic field to a rotor having permanent magnet and for sequentially switching the current energizing the stator coil based on a position detection signal obtained by comparing the change in the induced voltage generated in the stator coil not energized by rotation of the rotor and the standard voltage; and
a timing varying circuit for changing the timing to switch the current energizing the stator coil according to a pulse width of spike voltage generated due to flywheel current in the stator coil immediately after switching the current energizing the stator coil, wherein timing for switching current energizing the stator coil is advanced by half the pulse width of the spike voltage.

2. A motor system comprising the brushless motor control apparatus according to claim 1, and a brushless motor controlled by the brushless motor control apparatus.

3. A brushless motor control method comprising:
obtaining a rotating magnetic field by energizing a plurality of stator coils disposed so as to apply a rotating magnetic field to a rotor having permanent magnet;
sequentially switching the current energizing the stator coil based on a position detection signal obtained by comparing the change in induced voltage generated in the stator coil not energized by rotation of the rotor and the standard voltage;
changing the timing to switch the current energizing the stator coil according to the difference in the energizing current switching interval for the stator coil and a pulse width of spike voltage generated due to flywheel current in the stator coil immediately after switching the current energizing the stator coil; and
obtaining the difference by stopping measurement for a period equivalent to the pulse width of the spike voltage when the energizing current switching interval of the stator coil is measured.

4. A brushless motor control apparatus comprising:
a drive circuit for obtaining a rotating magnetic field by energizing a plurality of stator coils disposed so as to apply a rotating magnetic field to a rotor having permanent magnet and for sequentially switching the current energizing the stator coil based on a position detection signal obtained by comparing the change in induced voltage generated in the stator coil not energized by rotation of the rotor and the standard voltage; and
a mask signal generation unit for generating mask signal based on the position detection signal to mask the induced voltage from change in spike voltage generated due to flywheel current in the stator coil immediately after switching the current energizing the stator coil.

5. The brushless motor control apparatus according to claim 4 wherein the mask signal is generated before switching the current energizing the stator coil.

6. The brushless motor control apparatus according to claim 4 wherein the pulse width of the mask signal is a fixed electrical angle.

7. A motor system comprising the brushless motor control apparatus according to claim 4, and a brushless motor controlled by the brushless motor control apparatus.

8. A brushless motor control method comprising:
obtaining a rotating magnetic field by energizing a plurality of stator coils disposed so as to apply a rotating magnetic field to a rotor having permanent magnet;
sequentially switching the current energizing stator coil based on a position detection signal obtained by comparing the change in induced voltage generated in the stator coil not energized by rotation of the rotor and the standard voltage; and
generating mask signal based on the position detection signal and for masking the induced voltage from change in spike voltage generated due to flywheel current in the stator coil immediately after switching current energizing the stator coil.

9. A brushless motor control method according to claim 8, wherein a pulse of the spike voltage is removed by the mask signal from the induced voltage.

10. A brushless motor control method according to claim 9, wherein the position detection signal is generated by comparing the induced voltage from which the pulse of the spike voltage is removed with the standard voltage including an equivalent neutral point voltage.

11. A brushless motor control method according to claim 8, wherein the mask signal for masking the induced voltage for one of the stator coil is generated based on the position detection signal for switching the current energizing the other stator coil.

* * * * *